(12) United States Patent
Tiffany (10) Patent No.: US 7,698,632 B2
(45) Date of Patent: Apr. 13, 2010

(54) SYSTEM AND METHOD FOR DYNAMICALLY UPDATING WEB PAGE DISPLAYS

(75) Inventor: Barbara Q. Tiffany, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1457 days.

(21) Appl. No.: 11/060,190

(22) Filed: Feb. 17, 2005

(65) Prior Publication Data
US 2006/0184869 A1 Aug. 17, 2006

(51) Int. Cl.
G06F 17/00 (2006.01)
(52) U.S. Cl. .......................................... 715/234; 707/3
(58) Field of Classification Search ....................... 707/3
See application file for complete search history.

(56) References Cited

U.S. PATENT DOCUMENTS

| | | | |
|---|---|---|---|
| 5,617,565 A | | 4/1997 | Augenbraun et al. |
| 5,923,323 A | * | 7/1999 | Chiu et al. .................. 715/767 |
| 5,963,964 A | | 10/1999 | Nielsen |
| 5,966,135 A | | 10/1999 | Roy et al. |
| 6,012,087 A | | 1/2000 | Freivald et al. |
| 6,184,886 B1 | | 2/2001 | Bates et al. |
| 6,275,833 B1 | | 8/2001 | Nakamura et al. |
| 7,000,182 B1 | * | 2/2006 | Iremonger et al. .......... 715/235 |
| 7,096,418 B1 | * | 8/2006 | Singhal et al. .............. 715/205 |
| 2002/0072079 A1 | | 6/2002 | Woodaman |
| 2002/0122063 A1 | | 9/2002 | Weinberg et al. |
| 2002/0194151 A1 | | 12/2002 | Fenton et al. |
| 2004/0027391 A1 | | 2/2004 | Tu |
| 2004/0049541 A1 | * | 3/2004 | Swahn ........................ 709/203 |
| 2004/0049728 A1 | | 3/2004 | Langford |
| 2006/0085741 A1 | * | 4/2006 | Weiner et al. ............... 715/517 |
| 2007/0244854 A1 | * | 10/2007 | Nevill-Manning et al. ..... 707/3 |

OTHER PUBLICATIONS

Guelich, Scott et al.,"CGI Programming with Perl, $2^{nd}$ Edition," © Jun. 29, 2000, O'Reilly Media Inc., Chapters 4 & 10, series of pages relabled as pp. 1-50 of 50 (chapter 4) and 51-67 of 67 (chapter 10), 67 pages total.*

(Continued)

Primary Examiner—Doug Hutton
Assistant Examiner—James H Blackwell
(74) Attorney, Agent, or Firm—Schmeiser, Olsen & Watts; William E. Schiesser (57) ABSTRACT

A system and method for dynamically updating a web page display. Web pages modification is accomplished by receiving a uniform resource locator (URL) message having embedded application parameters, selecting desired portions of the application parameters, modifying the web page with the selected portions, and displaying the modified web page to the user. Application parameters may be search criteria used to find the search results, and the search criteria may be displayed along with the search results. The search results may include a number of entries each having an entry name and corresponding information location. A serial list of entries is received and a web page listing the entry names in an organized fashion is dynamically created. Hyperlinks between each entry name and its corresponding information location are then created, which allows information at the information location to be displayed when the corresponding entry name is selected.

9 Claims, 7 Drawing Sheets

OTHER PUBLICATIONS

Magdalini Eirinaki et al.; Web Mining for Web Personalization; ACM Transactions on Internet Technology; vol. 3, No. 1, Feb. 2003, pp. 1-27.

Tim Kindberg et al.; People, Places, Things: Web Presence for the Real World; Mobile Networks and Applications 7, pp. 365-376, 2002.

* cited by examiner

[e] http://gdlncntr.endicott.ibm.com/CTP_america_nsf/rolelookup?OpenView&Restrictlocategory=BCS w3 e-business Advisor Advisor  e business Solutions

☐ BluePages ☐ Search  ?HelpNow ☐ Feedback  Search ebA:

2003

| Home |
| for IBM |
| for Home |
| Business Solutions |
| Business on demand |
| Graphics |
| Solutions |

SMB contacts by role BCS

IBMer Name  External

Canada

FIG. 5

```
                IBMer Name External Ph# Tieline
▶ BCS
▶ BCS ntr
▶ BCS s
▶ BDE
▶ BDE Mgr
▶ BIS Cat Sp
▶ BIS SM
▶ eBH
▶ EC Reg BDE
▶ EC BL
▶ ECITSR
▶ ECTechSales
▶ ECTSR
▶ eTM
▶ eTM Mgr/BUE
▶ FOL
```

FIG. 6 (Prior Art)

Directory of SMB contacts

| view by Job Role | | | |
|---|---|---|---|
| BCS | i ts | Prtr GO Sp | TLts Sp |
| BCS Ptnc | IGE | Prtr IND Sp | TM |
| BCS SM | BITS Sp | PrtrProd Sp | TMM |
| BDE | ITSL | Prtr Sp | TPM |
| BDE Mgr | ITSR | SAM | TSE |
| BIS Cat Sp | ITSRa | SL | TSM |
| BIS SM | Learning Svc Sp | SO Dev | TSR |
| BPSM | LifeSc BDE | Storage ts | TSSL |
| eBM | LifeSc SL | Strg Sp | TSSL Exec |
| EC Reg BDE | LifeSc TSR | SWG TSS | TTiv Sp |
| EC SL | Other Mktg | TDM Sp | TWS Sp |
| EC ITSR | Other Terr | TE | VC BDE |
| ECITechSales | p Sp | Tele SAM | Websphere ts |
| ECTSB | p ts | TeleSam Mgr | x Sp |
| eTM | PC TSR | Ti DM Sp | x ts |
| eTM Mgr/BUE | PCT Mgr | Ti Lts Sp | XSP BDE |
| FCL | PCT Sp | Ti Tiv Sp | z Sp |
| i Sp | PCD ts | Ti WS Sp | |

| view by Region | | | | |
|---|---|---|---|---|
| All | Canada | LA | US-Central | US-East | US-West |

FIG. 7

SYSTEM AND METHOD FOR DYNAMICALLY UPDATING WEB PAGE DISPLAYS

BACKGROUND OF THE INVENTION

1. Technical Field

The present invention relates to a system and method for dynamically updating web page displays.

2. Related Art

There are many prior art systems which interact with a user to application parameters which are sent to an application running on a processing system, either local or remote. The application processes the application parameters to create information in a response. For example, the application parameters may be search criteria sent to a search engine running locally, on a local area network (LAN), a wide area network (WAN) or the Internet. The data searched may also be local, on a LAN, a WAN, or on the Internet. The results found are presented to the user on a display, however, the search criteria is not displayed. This requires the user to remember the exact search criteria when reviewing search results.

The search results are typically categorized and presented to the user as a serial list of entry names (each representing a category) and a hyperlink to an information location of information corresponding to the entry name. Typically, much of the serial list runs off of the screen. It was difficult to comprehend the list since only a small portion may be viewed at a time. Prior art methods have tried to 'hardcode' names for categories representing the data returned and list the names in a table format to show more of the information together on each page. However, the categories change over time and the 'hardcoded' names no longer match the data returned.

Therefore, there is currently a need for a system, and associated method, that describes what type of information is being displayed.

SUMMARY OF THE INVENTION

The present invention may be embodied as web page modification system for dynamically creating and displaying lists of entries each having an entry name and corresponding information location, the entries received in a response from a remote computing device, the web page modification system comprising:

an entry extractor adapted to receive the response and identify a plurality of entries in the response from the remote computing device; and a page modifier coupled to the entry extractor, the page modifier adapted to:
receive the response from the remote computing device;
receive the plurality of identified entries;
create a modified web page from the plurality of identified entries, their entry names, information locations and the remote computing device response; and
add a link to each entry name in the modified web page causing information at an information location corresponding to the entry name to be displayed when the entry name is selected.

The present invention may also be embodied as a method of creating a modified web page from a web page that was acquired in response to a URL message having a uniform resource locator (URL) indicating a remote computing device, the URL message also having application parameters, the method comprising:

acquiring the URL message;
copying at least a portion of the application parameters from the URL message;
sending the URL message to the remote computing device indicated by the URL;
receiving the web page returned from the remote computing device;
embedding the copied portions of the application parameters into the received web page to create a modified web page; and
displaying the modified web page.

The present invention may also be described as a method of automatically providing a columnar display having a desired number of columns of a list of entries, each having an entry name and a corresponding information location, the method comprising:

receiving the list of entries;
counting the entries to result in an entry total;
determining from the entry total, a maximum number of entries to be displayed on a web page being a page maximum;
determining a maximum number of entry names to be displayed per column from the maximum number of entries to be displayed per page and the desired number of columns to result in a column maximum;
displaying up to the maximum number of entry names to be displayed per web page in a columnar form, with each column having up to the column maximum number of entry names; and
creating links from a plurality of entry names to each of their corresponding information locations, such that when an entry name is selected, the information at its corresponding information location is displayed.

Another embodiment of the present invention is a method of remotely providing computer services to a remote user as a columnar display with a desired number of columns of a list of entries, each entry having an entry name and a corresponding information location, the method comprising:

interacting with a remote user to identify search criteria;
acquiring entries matching the search criteria, each entry having an entry name and an information location;
counting the identified entries to result in an entry total;
determining from the entry total, a maximum number of entries per page being a page maximum, and a maximum number of entries per column being a column maximum;
displaying the entry names in a columnar form to a remote user, with each column having up to the column maximum number of entry names per column; and
creating links from a plurality of entry names to their corresponding information locations such that when a remote user selects an entry name, information at the information location is displayed to the remote user.

The present invention may also be described as a computer program product, comprising a computer usable medium having computer readable program code embodied therein for creating a modified web page from a web page that was acquired in response to a URL message having a uniform resource locator (URL) indicating a remote computing device, the URL message also having application parameters, said computer readable program code including an algorithm adapted to:

acquire the URL message;
copy portions of the application parameters from the URL message;
send the URL message to the remote computing device indicated by the URL;

receive the web page returned from the remote computing device;

embed the copied portions of the application parameters into the received web page to create a modified web page; and display the modified web page.

BRIEF DESCRIPTION OF THE DRAWINGS

For purposes of clarity and brevity, like elements and components will bear the same designations and numbering throughout the figures.

DETAILED DESCRIPTION OF THE INVENTION

Figure 1:
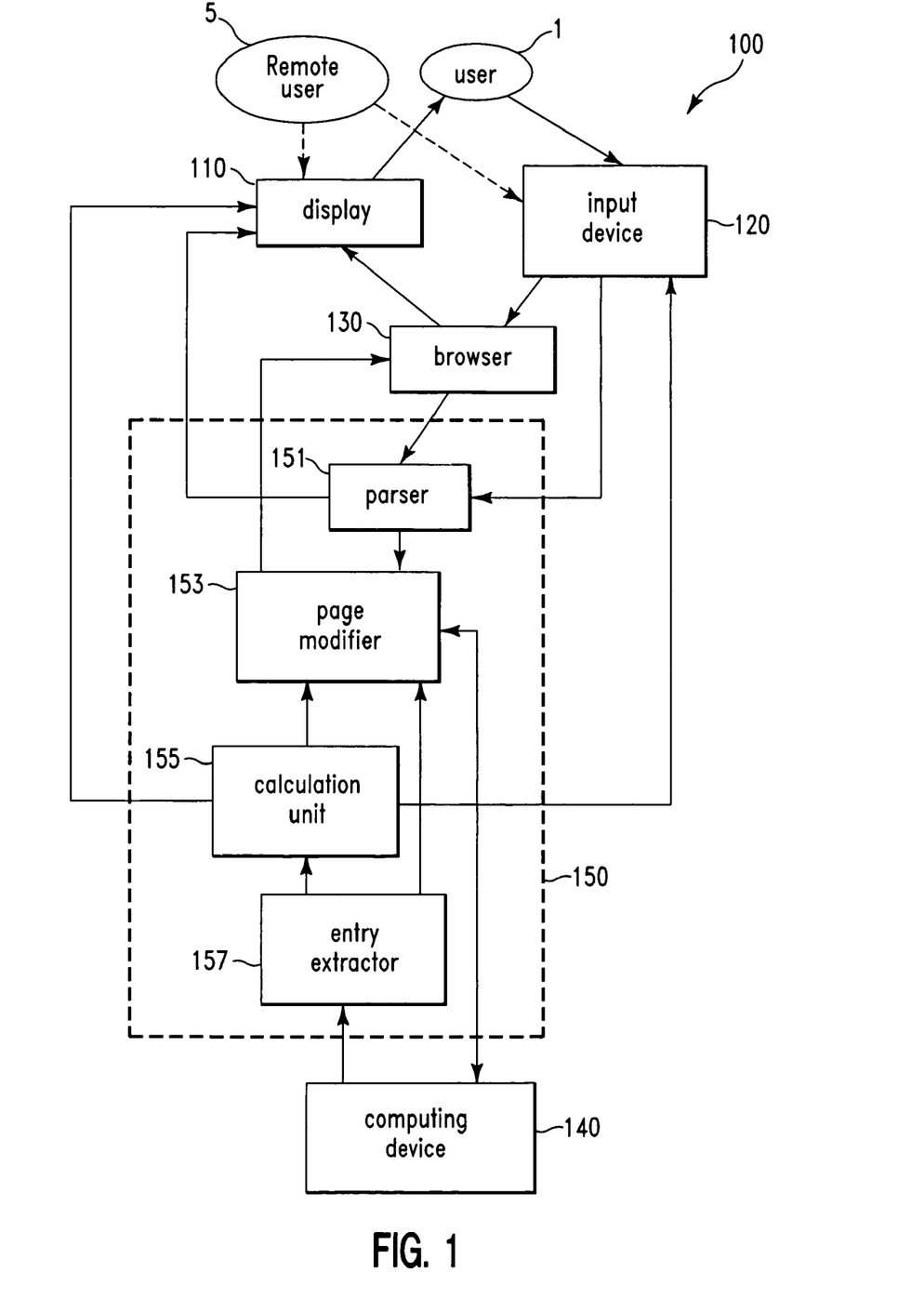
FIG. 1 is a simplified block diagram consistent with one embodiment of the present invention.

FIG. 1 shows a simplified block diagram consistent with one embodiment of the present invention. This figure is being described with interconnected blocks indicating functions of the system. It is to be understood that these may be implemented as separate interconnected functional devices or with one or more processing devices perform the functions of several blocks of the system.

A user 1 interacts with an input device 120 to define a uniform resource locator (URL) pointing to a desired computing device 140, which may be local, on a LAN, a WAN or the Internet with which user 1, and/or a remote user 5 intend to interact. Computing device 140 may be an application such as Lotus Notes® database software running on a processor or other hardware/software combination which does processing in the background, typically referred to as a "back end".

User 1 and/or remote user 5 also interact with browser 130 through input device 120 receiving visual feedback on a display 110, to define application parameters to be sent to computing device 140. These application parameters may be any information an application would need to provide the information desired by user 1, and/or remote user 5. One such set of application parameters would be search criteria.

Browser 130 packages the application parameters and the URL into a URL message which is sent to computing device 140 causing an application running on computing device 140 to return the appropriate information.

Browser 130 is typically running on a computing device located at a different location than that of computing device 140. Typically, computing device 140 is a server on the Internet and user 1 is at a different location from that of computing device 140. User 1 and/or user 5 are not required to have actual information of the server's actual location, other than to know its URL.

However, this invention may also function equally well with browser 130 running on computing device 140 for searching of its own local files, or that of its LAN or WAN.

The results from computing device 140 are returned having a plurality of entries each having an entry name and a corresponding location where the information relating to the entry name resides, called its information location. This information location may also be in the form of a URL.

In one embodiment of the present invention, a parser 151 is connected to browser 130. It receives the URL message and identifies the application parameters in the URL message, such as search parameters and other information. Parser 151 may also interact with input device 120 and display 110, and user 1 to define which information is to be extracted from the application parameters.

Parser 151 is connected to a page modifier 153 to which parser 151 provides a web page including the application parameters extracted by parser 151. Page modifier 153 is also connected to computing device 140 and receives the entries returned from computing device 140.

Page modifier 153 merges the received application parameters with the entries provided by computing device 140 to result in a modified web page sent to browser 130. Browser 130 causes the application parameters to be displayed on the modified web page of display 110. If the application parameters are search criteria, and the information returned by computing device 140 are search results, the result display 110 shows the modified web page having entry names of the search along with the exact search criteria.

Figure 5:
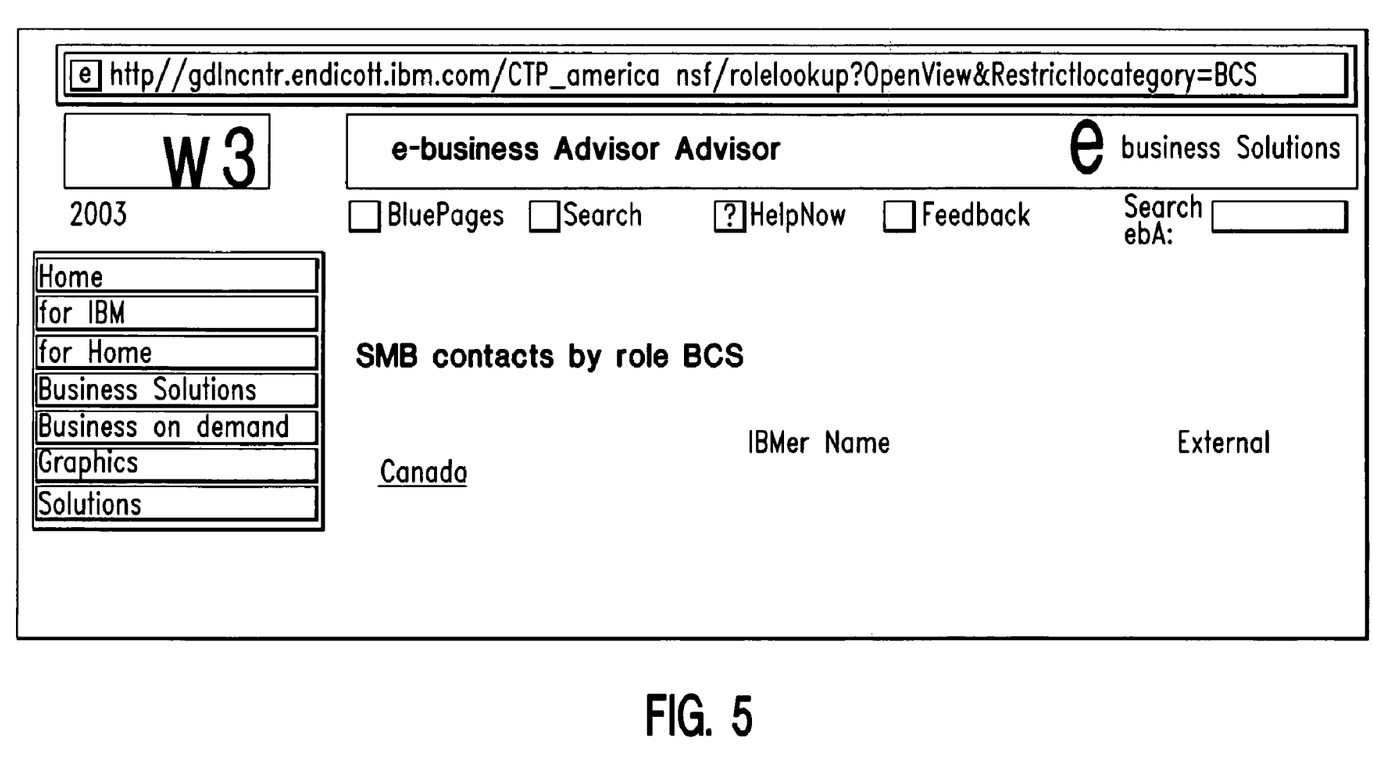
FIG. 5 is a screen shot generated by a browser.

A specific example of how the present invention may be implemented using Lotus Notes® running on computing device 140 is described below. A database having contact information denoted as "SMB Contacts" is accessed by computing device 140/Lotus Notes. Specifically, the search criteria searches for job rolls indicated as "BCS" in the SMB Contact data. FIG. 5 shows a screen shot generated by browser 130. The URL message created is shown in the address bar of the screen shot. The URL message is parsed to identify the application parameters here being a search criteria command "OpenView&Restricttocategory=" and a search criteria argument "BCS". Therefore, "BCS" is selected and copied from the URL message. The URL message causes computing device 140/Lotus Notes to return webpage results. "BCS" is then merged into search results webpage after the text "SMB Contacts by job role" to provide an indication of what was the exact criteria that were used along with the search results.

In order to provide a list display which is dynamically adjusted, other elements of the invention may be implemented. This also results in a display with more information in a more logical format.

In this embodiment of the present invention, an entry extractor 157 is coupled to computing device 140, either locally or remotely. Entry extractor 157 functions to receive the information returned by computing device 140. Entry extractor 157 then identifies a plurality of entries in the returned information, and identifies the name of each entry and a corresponding information location for each entry name.

Entry extractor 157 then passes this information to a calculation unit 155 which counts the number of entries, and calculates a maximum number of entry names to be displayed on a web page.

Calculation unit 155 also determines a number of columns to be displayed on each web page and a number of names in each column to produce a desired display. The format indicates a number of columns, the size of a table display, etc. in which to display the entry names is also determined. The above parameters may be defined through interaction with user 1 and/or remote user 5 through input device 120 and display 110.

Page modifier 153 is coupled to entry extractor 157 and calculation unit 155. Page modifier 153 receives the information returned from computing device 140, receives the plurality of identified entries from entry extractor 157, receives the maximum number of entry names per page, the number of columns to be displayed per page and the display format from calculation unit 155, and creates a modified web page. Page modifier 153 also creates links from the entry names to their corresponding information locations. The information locations may be to a location to, or in a file that may be stored either locally, on a WAN, or on the Internet.

The modified web page is provided to browser 130 which is displayed on display 110 to user 1 and/or remote user 5.

Therefore, when user 1 and/or user 5 clicks on an entry name, browser 130 goes to the proper information location to display information at that location. If the information location is a URL, browser 130 goes to the proper network, subnetwork, computer, drive, folder, subfolder and file that is indicated, and displays the information identified by that URL.

Figure 6:
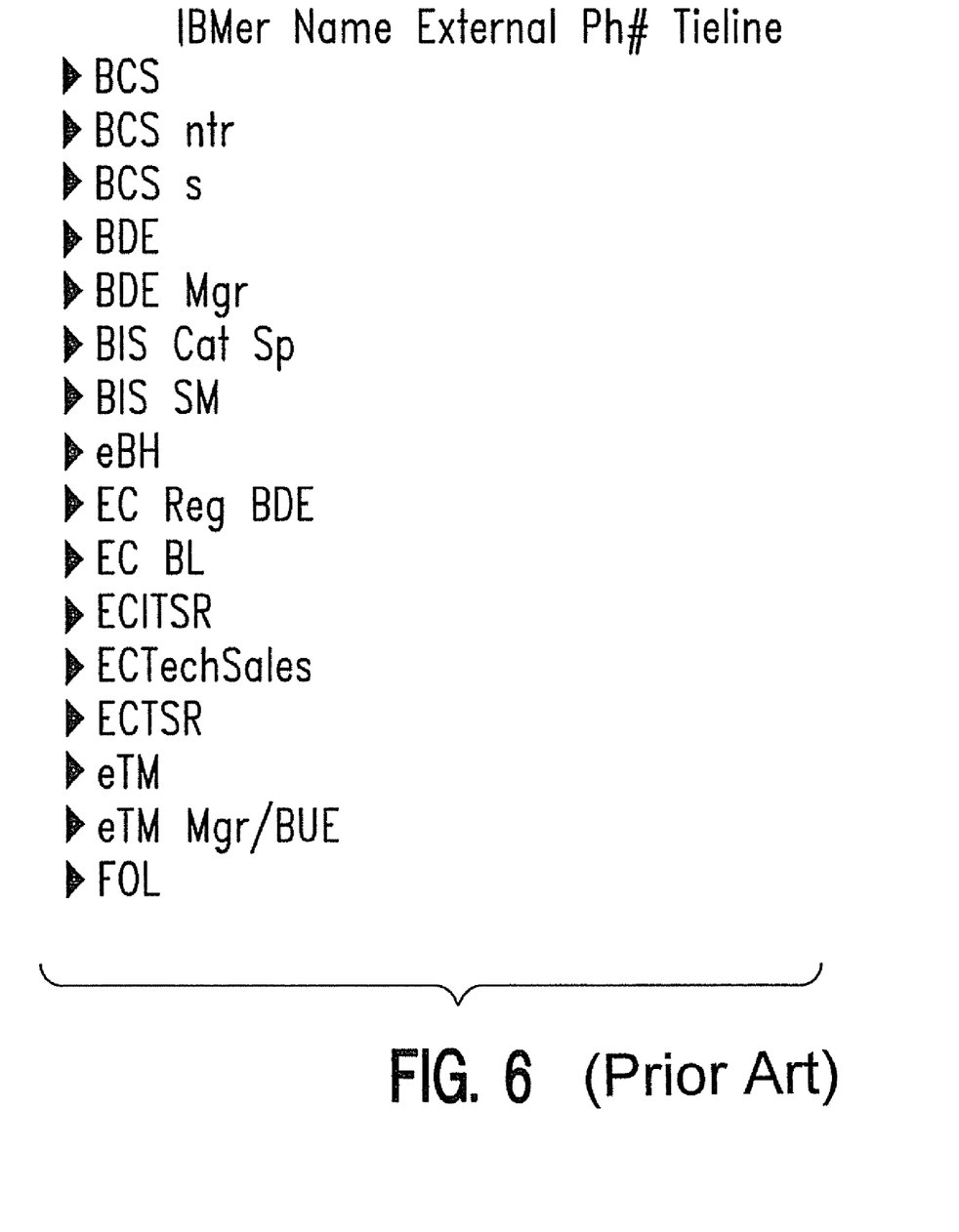
FIG. 6 is a screen shot showing a list displayed according to a prior art method.

A specific example for creating sets of URL links is described below. The desired number of columns is selected to be four columns. Lotus Notes® is selected to be the application running in computing device (140 of FIG. 1). The application parameters cause Lotus Notes to select and return a response listing employees of a company categorized by corporate job roles. The response includes 71 entries (categories) from the computing device 140 running Lotus Notes. These are displayed in four columns with the first three columns having 18 entry names and the last having 17 entry names. FIG. 6 is a screen shot showing how this information is displayed using prior art methods.

Below is an example of a script that runs on Lotus Notes. The script example creates links for the first column of entry names to be displayed.

val:=@Subset(testval; @Round((Elements(testvalue)/4)+ 0.1
db:=@ReplaceSubstring(@Subset(@DbName;-1);"\\";"/ ");
viewname:="rolelookup";
"[<a href=\"/"+db+"/"+viewname+ "?OpenView&Restricttocategory="+val+"\">"+val+ " "+"</a><br>]"

The above script takes approximately the first ¼ of the total number of job roles (entry names) in a view called "rolelookup" and places them in a column in a table. A hyperlink is built in the last line of the script for each of the entry names in the first ¼ of the elements in the view.

A similar script is used for the $2^{nd}$, $3^{rd}$, and $4^{th}$ columns.

Figure 7:
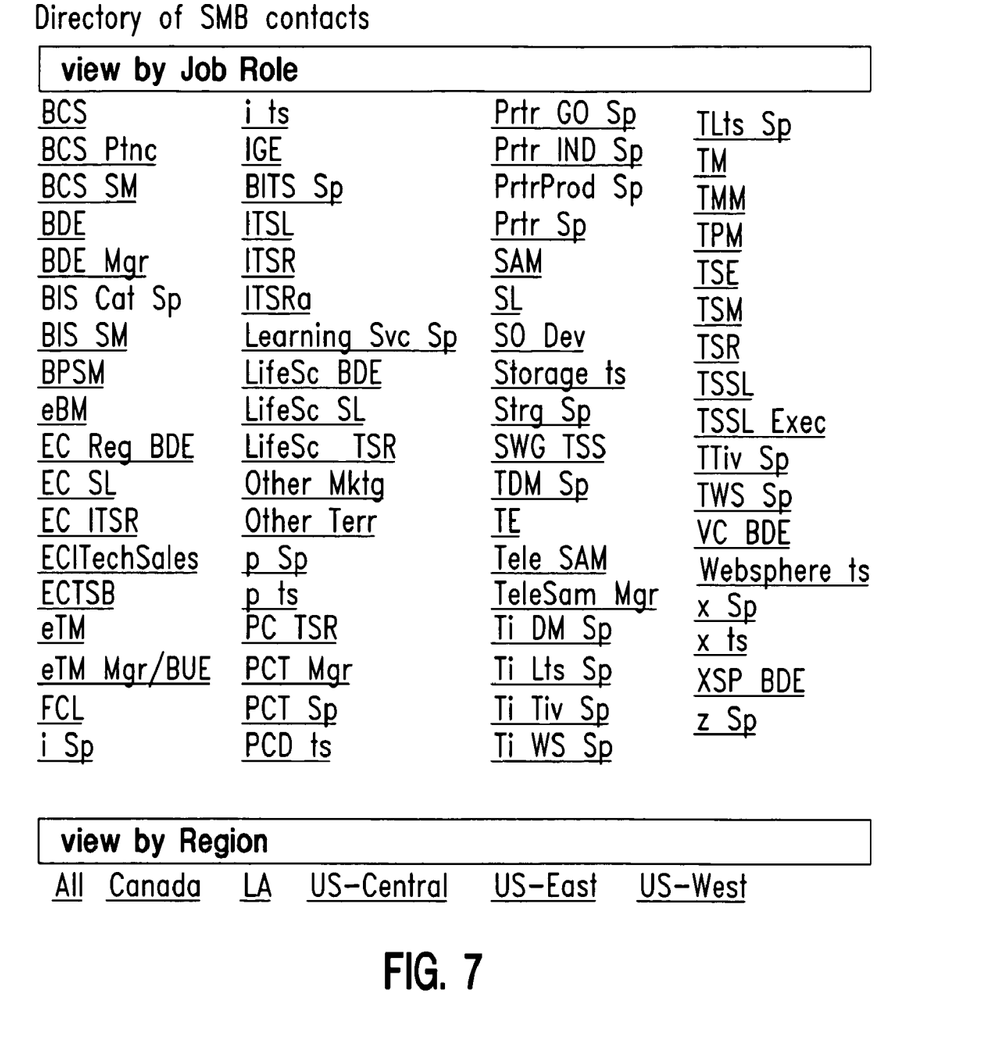
FIG. 7 is a screen shot showing a list displayed according to one embodiment of the present invention.

The result of the above code is shown in the screen shot of FIG. 7.

In FIG. 7, entry names returned from the computing device (140 of FIG. 1) are listed in four columns. Each entry name has a link to an information location where information relating to the entry name is located. This process is performed each time a web page is displayed to dynamically create entry names displayed in an understandable format.

In one embodiment of the present invention, a parser 151 and page modifier 153 modify the web page and are grouped together as a display modification device 150. This embodiment functions to display the selected application parameters lists with the returned information to user 1 and/or remote user 5.

Another embodiment of the present invention, display modification device 150 includes a parser 151, page modifier 153, entry extractor 157 and calculation unit 155. This embodiment displays the selected application parameters information of the URL message in the modified web page and also provides a dynamic list of entries from the information returned by computing device 140.

And in still another embodiment of the present invention, display modification device 150 includes page modifier 153, entry extractor 157 and calculation unit 155. This embodiment provides a dynamic list of entries from the information returned by computing device 140 without displaying any application parameters.

Figure 2:
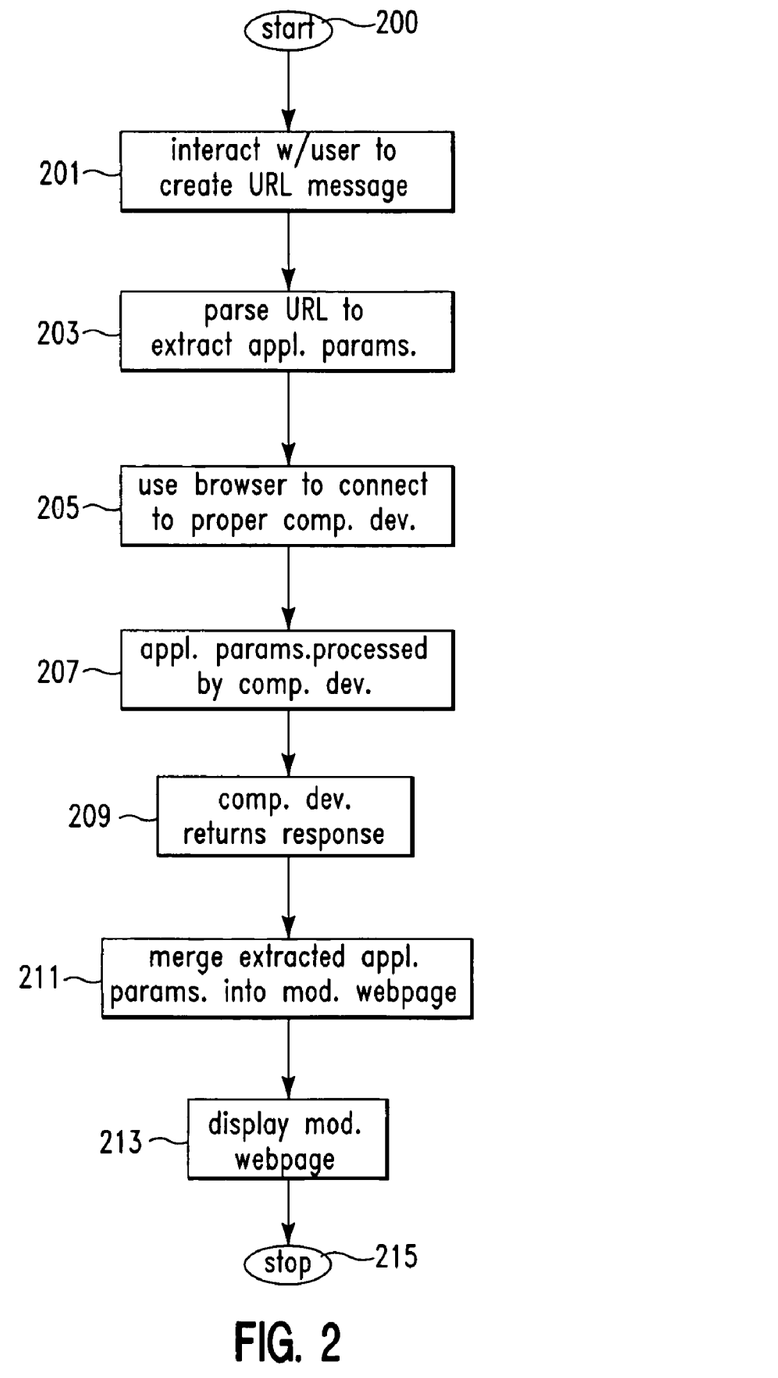
FIG. 2 is a flowchart illustrating the functioning of another embodiment of the present invention.

FIG. 2 is a flowchart illustrating the functioning of an embodiment of the present invention. The functioning of the present invention will be described in connection with FIGS. 1 and 2. The process starts at step 200. In step 201 a user/remote user interacts with browser 130 to identify the application parameters and a URL to pointing to a desired computing device 140. Browser 130 then creates a URL message having the URL and application parameters.

The URL message is parsed in step 203 by parser 151 to select all or a portion of the application parameters. For example, the search criteria may be parsed out of the URL message and selected.

In step 205, browser 130 uses the URL to identify and connect to computing device 140.

In step 207, computing device 140 processes the application parameters.

In step 209 computing device 140 returns a response having a plurality of embedded entries. This response may be in a web page format or other format.

In step 211, page modifier 153 merges the selected application parameters into the response web page to create a modified web page. If the response from computing device 140 is not in a web page format, page modifier 153 creates a web page from the returned response, then merges the selected application parameters into the web page to create the modified web page.

In step 213 the modified web page is displayed. The process ends at step 215.

Figure 3A:
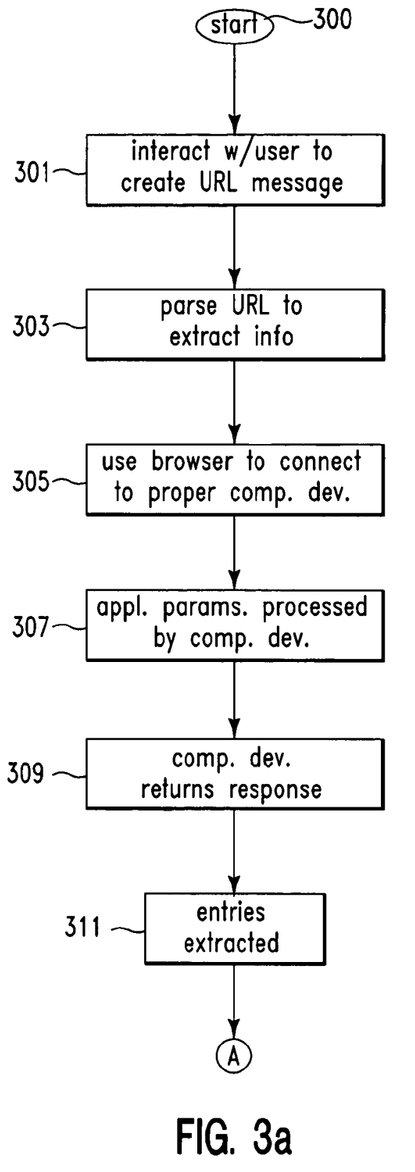
FIGS. 3a and 3b together are a flowchart illustrating the functioning of another embodiment of the present invention.
Figure 3B:
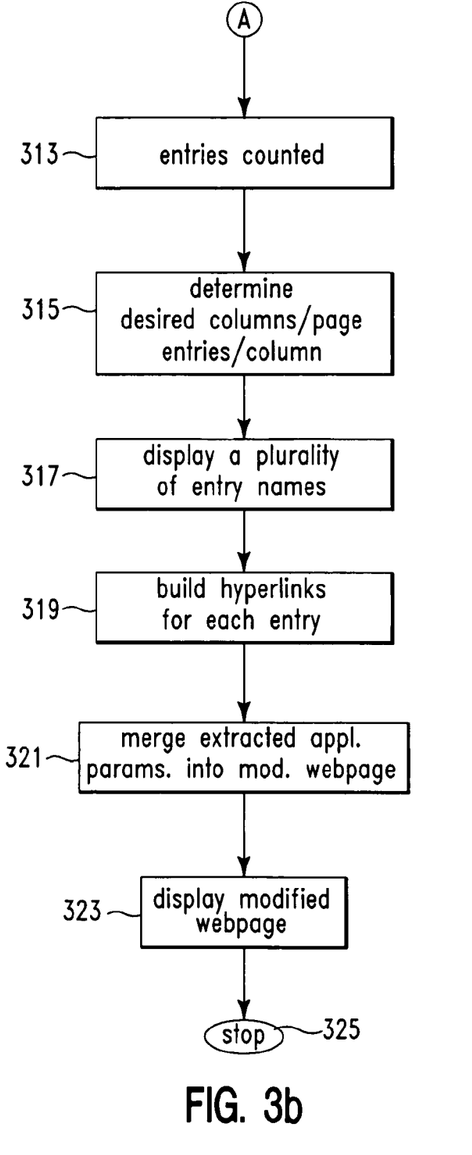

FIGS. 3a and 3b together are a flowchart illustrating the functioning of one embodiment of the present invention. The functioning of the present invention will be described in connection with FIGS. 1 and 3a. The process starts at step 300. In step 301 a user/remote user interacts with the browser to identify the application parameters and a URL to pointing to a desired computing device 140. Browser 130 then creates a URL message having the URL and the application parameters.

The URL message is parsed in step 303 by parser 151 to select all or a portion of the application parameters.

In step 305, browser 140 uses the URL to identify and connect to computing device 140.

In step 307, computing device 140 processes the application parameters.

In step 309 computing device 140 returns a response having a plurality of embedded entries.

In step 311, entry extractor 157 extracts a plurality of entry names and their corresponding information locations from the returned response.

The remaining functioning of the present invention will be described in connection with FIGS. 1 and 3b.

In step 313, the entries identified in the response are received from the entry extractor 157 and are counted.

In step 315 the maximum number of entries to be display on a web page, and the desired number of columns per page, and the number of entry names per column are determined. This may require interaction with user 1 and/or remote user 5.

In step 317, a plurality of entry names are displayed as specified in step 315, along with information from the response from computing device 140. If the information returned from computing device 140 is not in web page format, it is first converted to web page format and the above information is merged into it.

In step 319, the plurality of entry names are hyperlinked to their corresponding information locations.

In step 321, the extracted application parameters are merged into the web page to create a modified web page.

In step 323 the modified web page is displayed. The process ends at step 325.

Figure 4:
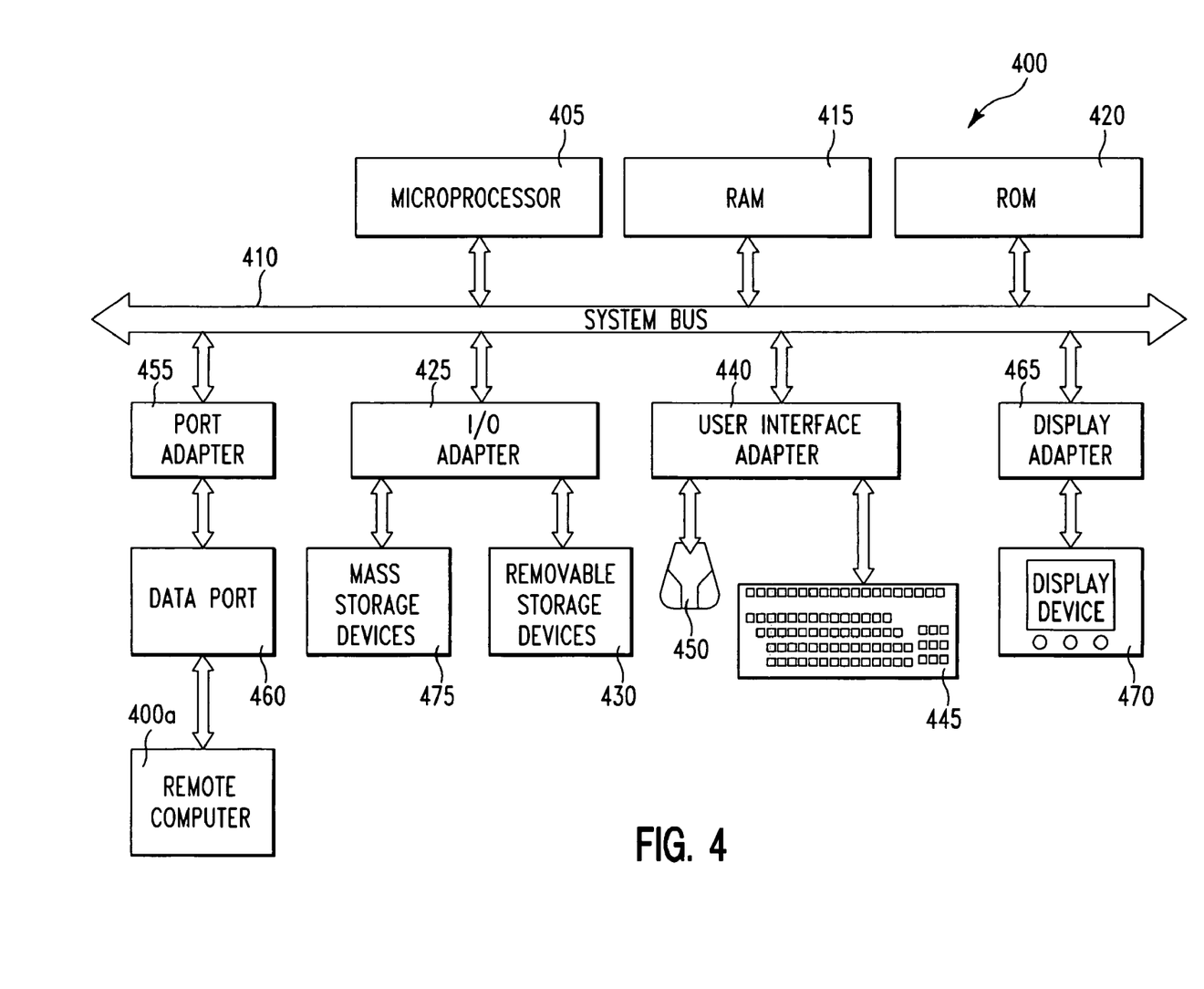
FIG. 4 is a schematic block diagram of a computer system capable of performing the functions of the present invention.

Generally, the elements described in connection with FIG. 1 and their functionality described in connection with FIGS. 2, 3a and 3b may be implemented on a single computer system 400 such as that shown in FIG. 4. It is also possible that one or more of the functions may be practiced by several interconnected computer systems, such as system 400a of FIG. 4 with each computer system performing one or more of the above-described functions. The methods described above may be coded as a set of machine-readable instructions and stored on removable or hard disk media for use by the general-purpose computer. FIG. 4 is a schematic block diagram of a general-purpose computer for practicing the present invention. In FIG. 4, a computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for communicating with a removable data and/or program storage device 430 and a mass data and/or program storage device 475. System bus 410 is also connected to a user interface adapter 440 for connecting a keyboard 445 and a mouse 450, a port adapter 455 for connecting a data port 460 such as a network interface adapter (NIC) and a display adapter 465 for connecting a display device 470. The NIC may be used to connect to remote databases and computers.

ROM 420 contains basic operating system instructions for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 475 include one or more hard disk drives and nonvolatile memory such as flash memory. These may be local or remote, directly connected, or connected through a network. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT), plasma displays and liquid crystal displays (LCD).

User interface adapter 440, mouse 450 and keyboard 445 may perform the function of input device (120 of FIG. 1). Similarly, display adapter 465 and display device 470 may perform the functions of display (110 of FIG. 1).

A computer program may be created by one of ordinary skill in the art and stored on the system or a data and/or program storage device 475, or fed into the computer through a data connection and executed to practice the present invention.

While FIG. 4 shows the computer system 400 as a particular configuration of hardware and software, any configuration of hardware and software, as would be known to a person of ordinary skill in the art, may be utilized for the purposes stated above in conjunction with the use of computer system 400 of FIG. 4.

While embodiments of the present invention have been described herein for purposes of illustration, many modifications and changes will become apparent to those skilled in the art.

Accordingly, the appended claims are intended to encompass all such modifications and changes as fall within the true spirit and scope of this invention.

What is claimed is:

1. A method of creating a modified web page from a web page that was acquired in response to a URL message having a uniform resource locator (URL) indicating a remote computing device, the URL message also having application parameters, the method comprising:

a browser constructing the URL message, said browser constructing the URL message comprising:
said browser interacting with a user through an input device of a computer system to identify the URL of the remote computing device,
said browser interacting with the user to define the application parameters, and
said browser creating the URL message from the URL and the application parameters which results in the URL message comprising the URL and the application parameters,
said URL in the URL message identifying the remote computing device;
a parser of a display modification device receiving the URL message from the browser and extracting application parameters from the application parameters in the U-RL message;
a page modifier of the display modification device receiving the extracted application parameters from the parser;
sending the URL message to the remote computing device identified by the URL;
an entry extractor of the display modification device receiving the web page returned from the remote computing device after the web page had been generated by the remote computing device from the extracted application parameters received by the remote computing device, said web page comprising a plurality of entries;
said page modifier acquiring the web page from the entry extractor;
said page modifier merging the extracted application parameters with the plurality of entries into the acquired web page to create a modified web page; and
a processor of the computer system displaying the modified web page on a display device of the computer system,
wherein each entry comprises an entry name and a corresponding information location, and wherein the method further comprises before said displaying:
a calculation unit of the display modification device counting the entries to result in an entry total;
said calculation unit determining from the entry total, a maximum number of entry names per column to be displayed being a column maximum, and a maximum number of entries per page, being a page maximum;
said page modifier modifying the acquired web page to display up to the page maximum entries in a columnar form, having a defined number of columns, with each column having up to the column maximum number of entry names per column; and
said page modifier modifying the acquired web page to link the plurality of entry names with their corresponding information locations, such that when an entry name is selected, information at the corresponding information location is displayed.

2. The method of claim 1, wherein an application parameter of the application parameters consists of a search criteria command and a search criteria argument.

3. The method of claim 2, wherein the method further comprises said processor displaying on the display device a result page, wherein the result page comprises an address bar that includes the URL, the search criteria command, and the search criteria argument, wherein the result page further comprises a text line below the address bar, and wherein the text line includes search result identification text followed by the search criteria argument.

4. A computer system comprising a processor, a computer readable memory unit coupled to the processor, an input device, and a display device, said memory unit containing program code configured to be executed by the processor to implement a method of creating a modified web page from a web page that was acquired in response to a URL message having a uniform resource locator (URL) indicating a remote computing device, the URL message also having application parameters, the method comprising:
   a browser constructing the URL message, said browser constructing the URL message comprising:
      said browser interacting with a user through the input device to identify the URL of the remote computing device,
      said browser interacting with the user to define the application parameters, and
      said browser creating the URL message from the URL and the application parameters which results in the URL message comprising the URL and the application parameters, said URL in the URL message identifying the remote computing device;
   a parser of a display modification device receiving the URL message from the browser and extracting application parameters from the application parameters in the URL message;
   a page modifier of the display modification device receiving the extracted application parameters from the parser;
   sending the URL message to the remote computing device identified by the URL;
   an entry extractor of the display modification device receiving the web page returned from the remote computing device after the web page had been generated by the remote computing device from the extracted application parameters received by the remote computing device, said web page comprising a plurality of entries;
   said page modifier acquiring the web page from the entry extractor;
   said page modifier merging the extracted application parameters with the plurality of entries into the acquired web page to create a modified web page; and
   displaying the modified web page on the display device, wherein each entry comprises an entry name and a corresponding information location, and wherein the method further comprises before said displaying:
      a calculation unit of the display modification device counting the entries to result in an entry total;
      said calculation unit determining from the entry total, a maximum number of entry names per column to be displayed being a column maximum, and a maximum number of entries per page, being a page maximum;
      said page modifier modifying the acquired web page to display up to the page maximum entries in a columnar form, having a defined number of columns, with each column having up to the column maximum number of entry names per column; and
      said page modifier modifying the acquired web page to link the plurality of entry names with their corresponding information locations, such that when an entry name is selected, information at the corresponding information location is displayed.

5. The computer system of claim 4, wherein an application parameter of the application parameters consists of a search criteria command and a search criteria argument.

6. The computer system of claim 5, wherein the method further comprises displaying on the display device a result page, wherein the result page comprises an address bar that includes the URL, the search criteria command, and the search criteria argument, wherein the result page further comprises a text line below the address bar, and wherein the text line includes search result identification text followed by the search criteria argument.

7. A computer program product, comprising a computer readable storage medium having a computer readable program code stored therein, said computer readable program code containing instructions configured to be executed by a processor of a computer system to implement a computer program product of creating a modified web page from a web page that was acquired in response to a URL message having a uniform resource locator (URL) indicating a remote computing device, the URL message also having application parameters, the method comprising:
   a browser constructing the URL message, said browser constructing the URL message comprising:
      said browser interacting with a user through an input device of the computer system to identify the URL of the remote computing device,
      said browser interacting with the user to define the application parameters, and
      said browser creating the URL message from the URL and the application parameters which results in the URL message comprising the URL and the application parameters, said URL in the URL message identifying the remote computing device;
   a parser of a display modification device receiving the URL message from the browser and extracting application parameters from the application parameters in the URL message;
   a page modifier of the display modification device receiving the extracted application parameters from the parser;
   sending the URL message to the remote computing device identified by the URL;
   an entry extractor of the display modification device receiving the web page returned from the remote computing device after the web page had been generated by the remote computing device from the extracted application parameters received by the remote computing device, said web page comprising a plurality of entries;
   said page modifier acquiring the web page from the entry extractor;
   said page modifier merging the extracted application parameters with the plurality of entries into the acquired web page to create a modified web page; and
   displaying the modified web page on a display device of the computer system, wherein each entry comprises an entry name and a corresponding information location, and wherein the method further comprises before said displaying:
      a calculation unit of the display modification device counting the entries to result in an entry total;
      said calculation unit determining from the entry total, a maximum number of entry names per column to be displayed being a column maximum, and a maximum number of entries per page, being a page maximum;

said page modifier modifying the acquired web page to display up to the page maximum entries in a columnar form, having a defined number of columns, with each column having up to the column maximum number of entry names per column; and said page modifier modifying the acquired web page to link the plurality of entry names with their corresponding information locations, such that when an entry name is selected, information at the corresponding information location is displayed.

8. The computer program product of claim 7, wherein an application parameter of the application parameters consists of a search criteria command and a search criteria argument.

9. The computer program product of claim 8, wherein the method further comprises displaying on the display device a result page, wherein the result page comprises an address bar that includes the URL, the search criteria command, and the search criteria argument, wherein the result page further comprises a text line below the address bar, and wherein the text line includes search result identification text followed by the search criteria argument.

\* \* \* \* \*